US007912488B1

United States Patent
El-Fishawy

(10) Patent No.: US 7,912,488 B1
(45) Date of Patent: *Mar. 22, 2011

(54) COMMUNICATION SYSTEMS AND METHODS

(75) Inventor: Sani El-Fishawy, Woodside, CA (US)

(73) Assignee: Core Mobility, Inc., Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/853,816

(22) Filed: Aug. 10, 2010

Related U.S. Application Data

(60) Continuation of application No. 11/229,293, filed on Sep. 16, 2005, now Pat. No. 7,792,541, which is a division of application No. 10/652,867, filed on Aug. 29, 2003, now Pat. No. 7,069,032.

(51) Int. Cl.
*H04B 7/00* (2006.01)
(52) U.S. Cl. ........................................ 455/518; 455/517
(58) Field of Classification Search .................. 455/517, 455/518
See application file for complete search history.

(56) References Cited

U.S. PATENT DOCUMENTS

| | | | |
|---|---|---|---|
| 6,477,150 B1 | 11/2002 | Maggenti et al. |
| 6,728,546 B1 | 4/2004 | Peterson et al. |
| 6,738,617 B2 | 5/2004 | Rosen et al. |
| 7,069,032 B1 | 6/2006 | El-Fishawy |
| 7,130,651 B2 | 10/2006 | El-Fishawy |
| 2002/0077136 A1 | 6/2002 | Maggenti et al. |
| 2002/0172165 A1 | 11/2002 | Rosen et al. |
| 2003/0002449 A1 | 1/2003 | Rittle et al. |
| 2003/0153342 A1 | 8/2003 | Crocket et al. |
| 2003/0153343 A1 | 8/2003 | Crocket et al. |
| 2003/0154243 A1 | 8/2003 | Crocket et al. |
| 2003/0235184 A1 | 12/2003 | Dorenbosch et al. |
| 2004/0127251 A1 | 7/2004 | Thakkar et al. |
| 2004/0198425 A1 | 10/2004 | Mellone et al. |

OTHER PUBLICATIONS

U.S. Appl. No. 10/652,867, filed Aug. 29, 2003, El-Fishawy.
U.S. Appl. No. 11/229,293, filed Sep. 16, 2005, El-Fishawy.
U.S. Appl. No. 11/229,242, filed Sep. 16, 2005, El-Fishawy.

*Primary Examiner* — Duc Nguyen
*Assistant Examiner* — Ankur Jain
(74) *Attorney, Agent, or Firm* — Workman Nydegger

(57) ABSTRACT

The floor in a network-based instant connect communication session is managed such that a mobile device user can cause voice data to be transmitted to a remote party without the remote party giving consent to relinquishing the floor. After the network-based instant connect communication session is established, and as the remote party holds the floor, the mobile device user presses a talk button on the mobile device or otherwise provides input. The input causes the network-based instant connect communication session to transition from the original half-duplex communication to full-duplex communication. The mobile device user can then cause voice data to be sent to the remote device. In this manner, the mobile device user can interrupt or spontaneously respond to the remote party without waiting for the remote party to relinquish the floor. This facilitates comfortable two-way communication in a network-based instant connect communication session.

12 Claims, 4 Drawing Sheets

COMMUNICATION SYSTEMS AND METHODS

This application is a continuation of U.S. patent application Ser. No. 11/229,293, filed Sep. 16, 2005; which is a divisional of U.S. patent application Ser. No. 10/652,867, filed Aug. 29, 2003, now U.S. Pat. No. 7,069,032. All of these applications are incorporated herein by reference.

BACKGROUND OF THE INVENTION

Field of the Invention

The Relevant Technology

During recent years, various forms of mobile communication devices using radio signals have become more widely used. An early example of mobile communication, and one which has been in use for decades, is two-way radio devices, commonly known as "walkie-talkies." Conventional walkie-talkies have a range of up to several thousand meters and transmit voice signals over a selected radio frequency. A transmitting walkie-talkie can communicate with another, recipient walkie-talkie that is within the transmitting range and is tuned to the selected frequency. Walkie-talkies have been widely used in industrial, construction and recreational settings.

One of the convenient features of walkie-talkies is the ability to immediately initiate communication with recipients without requiring the user who initiates the communication to input a telephone number or to wait while call setup is performed. Instead, the user merely presses a button on the mobile communication device and begins speaking. Any recipient device that is within range and is tuned to the selected frequency immediately receives the voice data. The receiving party can immediately receive the communication without having to respond to a ring or other audible signal, such as those that have been associated with the act of answering a ringing telephone.

A typical walkie-talkie communication session occurs when participating devices are tuned in to a particular radio frequency. The communication session is a half-duplex event, wherein the data can only flow in one direction at a time. In such communication sessions, the right or ability to transmit data is known as "having the floor". Management of the floor is important in any half-duplex communication session to indicate the direction of data flow and to avoid confusion on part of the participants that might arise if both parties attempt to speak at the same time. In conventional walkie-talkies, the floor is obtained by one of the mobile devices when the user presses the "talk" button on his device. The party who has the floor can speak into the device and transmit the resulting voice data to the recipient. In this sense, the party having the floor is designated herein as being the "sending" party, while the party who does not have the floor is referred to herein as being the "receiving" party.

During the past few years, consumer electronics companies have introduced highly-popular personal walkie-talkies. Such personal walkie-talkies are widely used in recreational and family situations, as well as by industrial and commercial users. The advantages of the newer personal walkie-talkies include lower cost and the ability to easily select from fifty or more communication channels. Personal walkie-talkies do not require the user to enter a telephone number or wait during call setup and the receiving party can immediately receive voice data without having to answer a ringing telephone. However, personal walkie-talkies also operate in half-duplex mode over a selected radio frequency and are characterized by a lack of security, limited range, and the same floor control patterns, as conventional walkie-talkies. Nonetheless, personal walkie-talkies have been a successful consumer electronics product.

Cellular or mobile telephones are another example of mobile communications devices whose use has become widespread during recent years. Unlike walkie-talkies, mobile telephones operate over a network using a full-duplex communication channel that uses code-division or time-division multiplexing. Because of the full-duplex nature of the communication, floor control is not a significant issue in mobile telephone communication. Both parties to a mobile telephone call have the ability to simultaneously send and receive voice data at any time during the call. In addition, mobile telephone communication has an essentially unlimited range and is highly secure because of the call setup routines and the multiplexing of the communication channels. Typical mobile telephone communication requires entering a multi-digit telephone number, waiting during call setup, and manually activating the receiving mobile device in response to a ring or other audible signal indicating that a call is incoming.

The convergence of walkie-talkie radio communication and mobile telephone communication is often referred to as "push-to-talk", which offers a near instant connection and two-way communication between users. Communication can be one-to-one or one-to-many. One example of a push-to-talk system is Nextel's iDEN-based Push to Talk® (also known as Direct Connect™) service that has become very popular over the past several years. Push-to-talk systems may also be implemented using standard voice-over Internet protocol (VoIP) technologies or other IP telephony technologies, wherein voice information is sent in digital form over IP-based data networks. Such push-to-talk systems are hereinafter referred to as "network-based instant connect systems", and they can be deployed on many types of networks, including wireless and wireline networks. A network-based instant connect call is a telephone call established using a network, but in a way that is designated to give the user the experience of a conventional or personal walkie-talkie call. For instance, in wireless networks, network-based instant connect calls are initiated when the user selects a recipient from a contact list on the mobile device and presses the talk button. Likewise, network-based instant connect calls are received by automatically activating the receiving device for immediate output of voice data without requiring the recipient to manually respond to a ring or other audible signal. Because the network-based instant connect call is typically established over a wireless network, the call requires numbers that identify the participating mobile devices, such as telephone numbers, and a call setup routine. Unlike conventional walkie-talkie communication, network-based instant connect calls have essentially unlimited range and security features of a conventional mobile telephone call.

Although wireless networks on which network-based instant connect calls are typically carried inherently have full-duplex capabilities, floor control is usually moderated so as to mimic the conventional walkie-talkie experience. In particular, the user who presses the talk button on a suitably enabled mobile device obtains the floor and can send voice data until the button is released. The recipient of the voice data who does not have the floor can merely receive the voice data and cannot take the floor until the other party relinquishes the floor.

Since these techniques for floor control in network-based instant connect calls mimic the conventional walkie-talkie user experience, the resulting conversation between the calling parties also suffers from the inherent drawbacks of communicating in the style of a walkie-talkie. In typical wireline and mobile telephone calls, the full-duplex nature of the communication permits the conversing parties to engage in normal, spontaneous two-way conversation, including the patterns of feedback, response, and interruption that are similar to those associated with face-to-face communication. In contrast, network-based instant connect conversations are characterized by successive periods during which the floor is held by alternating parties until such time that these parties relinquish the floor by releasing the talk button. Such conversations do not permit the conversing parties to engage in the two-way speech patterns that are part of normal face-to-face or telephone conversations. Thus, network-based instant connect conversations are somewhat unnatural and difficult, particularly for those who do not have significant experience using walkie-talkies.

SUMMARY OF THE INVENTION

The present invention is directed to the management of the floor allocated between the devices of calling parties in network-based instant connect communication. The floor control methods of the invention can be applied to network-based instant connect calls that are established in conventional ways. A network-based instant connect call is initiated when the calling party uses a network-based instant connect device to initiate a communication session over a network to a designated recipient device. The calling party obtains the floor at the initiation of the call by pressing the talk button. In this regard, the network-based instant connect call has been initiated and set up in a manner similar to existing network-based instant connect techniques.

According to the invention, the half-duplex communication of the network-based instant connect session transitions to full-duplex communication in a way that facilitates patterns of two-way conversation that are common to face-to-face and typical full-duplex telephone conversations, but have been absent in conventional network-based instant connect calls. In general, the floor is controlled according to the invention in a way other than permitting the party having the floor to maintain it so long as the party continues to press the talk button.

According to a method of the invention, the floor is managed by transitioning from half-duplex communication to full-duplex communication at some point after the network-based instant connect call is established. The transition to full-duplex communication, which is inherently supported by the network, eliminates the need for sequential floor transitions between the calling parties. For instance, after the network-based instant connect call is initiated and a receiving party responds thereto, the call can be transitioned from half-duplex communication to full-duplex communication. This transition can be initiated in a way that is transparent to the calling parties, other than the fact that, once it is complete, the calling parties can then engage in ongoing two-way communication that is similar to that of a typical telephone call. For example, a preference to automatically transition to full-duplex communication once both parties are communicating can be specified such that the transition to full-duplex communication happens automatically without the need for either user to intervene. Alternatively, the transition can occur after one or both parties manually indicate to the network-based instant connect device to send a request to make the transition. This could occur by pressing one or more keys on a device keypad, pressing soft keys on the device or by speaking a recognized voice command.

These techniques of the invention enhance the practical usability of network-based instant connect calls and network-based instant connect systems. The beneficial and attractive features of network-based instant connect calls are maintained, while eliminating the unnatural speech and conversation patterns that have been characteristic of network-based instant connect calls. Existing network-based instant connect systems can be adapted to operate with the invention, which means that the existing infrastructure investments that have been made by companies who offer network-based instant connect services can be leveraged to improve the communication services offered to customers.

The other attractive features of conventional network-based instant connect calls are present, including call security, extended communication range, the existence of a talk button that is used during the network-based instant connect call, and the automatic and immediate receipt of voice data at the receiving device without requiring the receiving party to manually respond to a ring or other audible signal.

A significant benefit of this method is that a receiving party can respond to, provide feedback to, or interrupt the sending party at any time regardless of whether the sending party chooses to relinquish the floor. This permits the network-based instant connect call to exhibit the casual, two-way conversation patterns that have been absent in conventional network-based instant connect calls. Additionally, the ability to "interrupt" a sender is particularly useful during group network-based instant connect calls since multiple speakers may desire to interject a remark or otherwise acknowledge a speaker at any time during the communication session, thereby enhancing the interactivity of the group's communication.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

The present invention is directed to systems and methods for controlling the floor that is allocated between devices engaged in network-based instant connect communication. In general, the methods of the invention permit a party to initiate the transmission of voice data in a network-based instant connect communication session without waiting for the remote party to relinquish the floor. According to a first embodiment of the invention, the party takes the floor from the remote party by pressing a talk button on the network-based instant connect device or otherwise generating a floor request signal. The floor is taken in this manner without requiring the remote party to give up the floor or otherwise give consent to the floor being given to the other party.

According to a second embodiment of the invention, the need to allocate the floor between the calling parties is eliminated by transitioning the network-based instant connect call from half-duplex communication to full-duplex communication. This transition can take place after a receiving party has provided input that indicates that the network-based instant connect call has been accepted. According to either of these techniques, the parties engaged in network-based instant connect communication can interrupt, respond to, or otherwise provide feedback to each other in ways that are similar to the conversion patterns of telephone calls as opposed to those that have been previously associated with network-based instant connect calls.

1. Network-based Instant Connect Systems

Figure 1:
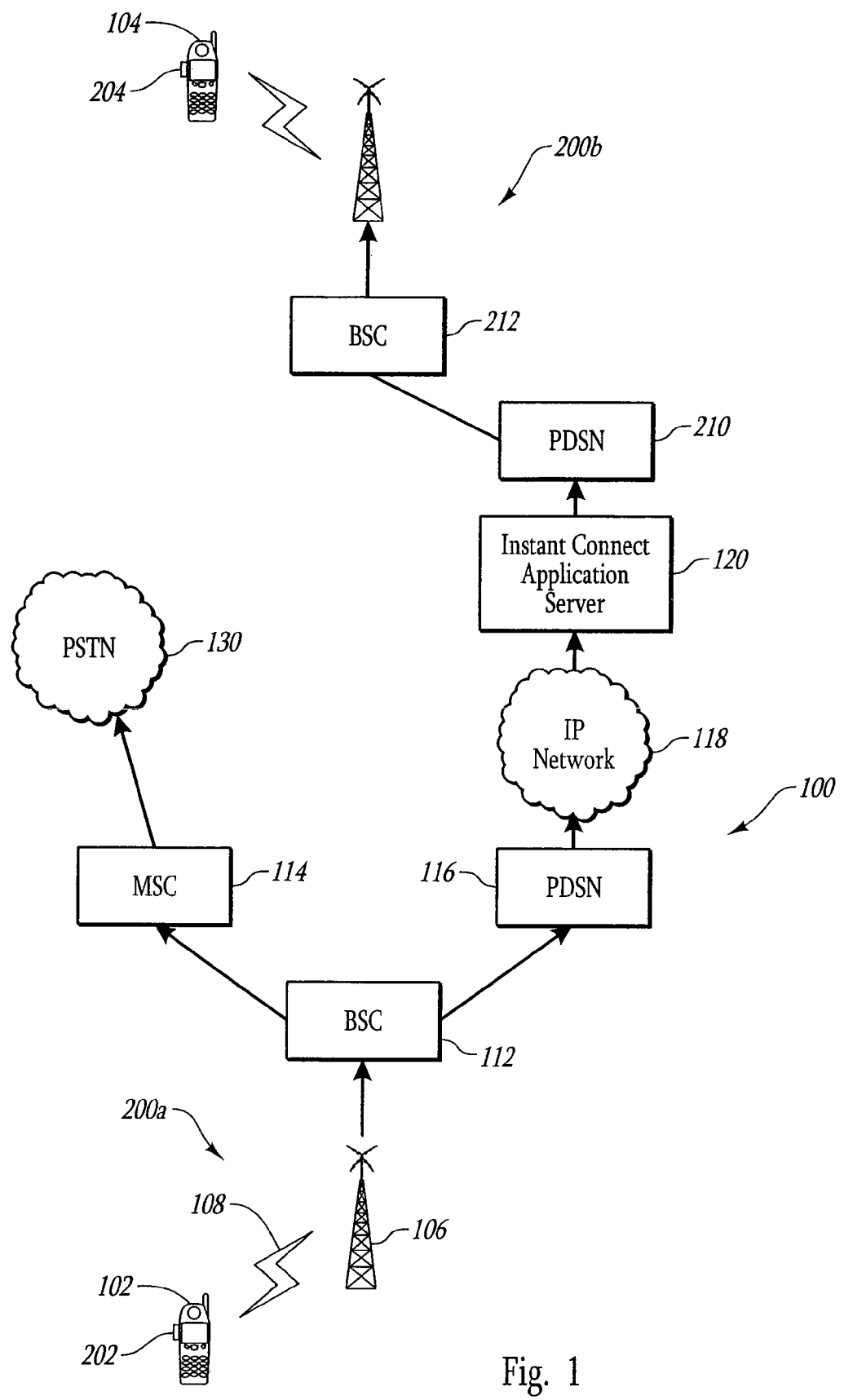
FIG. 1 is a block diagram illustrating a wireless network in which the network-based instant connect communication systems of the invention may be practiced.

In order to describe the various methods of the invention, FIG. 1 illustrates an example of network 100 in which the invention can be practiced. It is to be understood that the network of FIG. 1 represents only an example of the suitable environments in which the invention can be implemented, and that other network architectures, including wireline networks, are possible. Network 100 includes one or more wireless telephone networks that operate with network-based instant connect devices 102 and 104. In the illustrated example, device 102 operates within cellular network 200a, while device 104 operates within cellular network 200b.

FIG. 1 illustrates base station 106 in cellular network 200a that communicates with network-based instant connect device 120 by transmitting and receiving radio signals 108. Base stations 106 and other base stations in network 200a operate over respective regions or cells within which the radio signals 108 are sufficiently strong to provide reliable communication. In cellular networks, a grid of partially overlapping cells is positioned in a geographic area to provide service for the network-based instant connect devices anywhere in the range of the cells. Base station 106 may operate under the control of associated base station controllers 112, which may in turn be coupled with a packet data serving node (PDSN) 116. Base station 106 may also be coupled with a mobile switching center 114, which enables device 102 to communicate with the public switched telephone network (PSTN) 130.

In network 100 of FIG. 1, network-based instant connect device 102 may acquire radio connectivity and IP network connectivity in a manner well known in the art. For example, device 102 may issue an origination request to mobile switching center 114, which may send the request back to BSC 112. BSC 112 may assign a traffic channel to device 102, or it might forward the request to PDSN 116, which works with device 102 to establish a data link by which voice and data is transmitted to and received from the device. Device 102 may then initiate and participate in network-based instant connect communication sessions with the assistance of a PDSN 116, which provides device 102 with a gateway to IP network 118. The voice data from device 102 is then delivered to a network-based instant connect application server 120, which among other functionality, may be responsible for arbitrating and managing floor control allocation.

Alternatively, rather than floor control being arbitrated by a network element such as an instant connect application server, the logic to implement floor control allocation may be resident on the network-based instant connect device, in which case the participating devices decide who controls the floor. In FIG. 1, since the other network-based instant connect device 104 is located within the range of a cellular network 200b, the base station controller 212 and associated PDSN 216 are used to establish the communication between the devices 102 and 104. Network-based instant connect device 104 acquires radio connectivity and IP network connectivity with the assistance of the associated BSC 212 and PDSN 216 as described previously. In this way, the network-based instant connect devices 102 and 104 can communicate with substantially any other compatible network-based instant connect devices that are located in the interoperating cellular networks, such as networks 200a, 200b, etc.

It should be understood that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

Network-based instant connect calls in network 100 are designed to give the calling parties an experience similar to those that are associated with the use of a conventional or personal walkie-talkie. Network-based instant connect devices 102 and 104 have talk buttons 202 and 204, respectively. The talk buttons are used to initiate the transmission of voice data from the corresponding network-based instant connect devices in ways that are described herein in reference to FIGS. 2a, 2b and 3. In general, network-based instant connect calls are initiated when the user selects a recipient and presses the talk button. Network-based instant connect calls are received as the receiving device is automatically activated and caused to output the incoming voice data without requiring the recipient to manually respond to a ring or other audible signal. Network-based instant connect calls have the essentially unlimited range and security features of a conventional mobile telephone call.

Although the cellular networks 200a and 200b on which network-based instant connect calls are carried inherently have full-duplex capabilities, network-based instant connect calls are transmitted, at least initially, using half-duplex communication so as to mimic the walkie-talkie experience. The use of the half-duplex communication means that data can travel in only one direction at any given time. In order to indicate to the system in which direction voice data should be sent, network-based instant connect devices 102 and 104 may utilize a "talk" button or other user input mechanism which causes the floor to be allocated to one party. The device that has the floor has the ability to transmit voice data, whereas the device that does not have the floor can only receive the data. As described in FIGS. 2a, 2b and 3, the methods of the invention enable the party without the floor to initiate the transmission of voice data without waiting for the remote party to relinquish the floor. These methods can be performed in existing cellular networks (e.g., networks 200a and 200b) that have network-based instant connect capabilities as well as with existing network-based instant connect devices that have been adapted to perform the acts disclosed herein.

2. Floor Transfer Methods

Figure 2A:
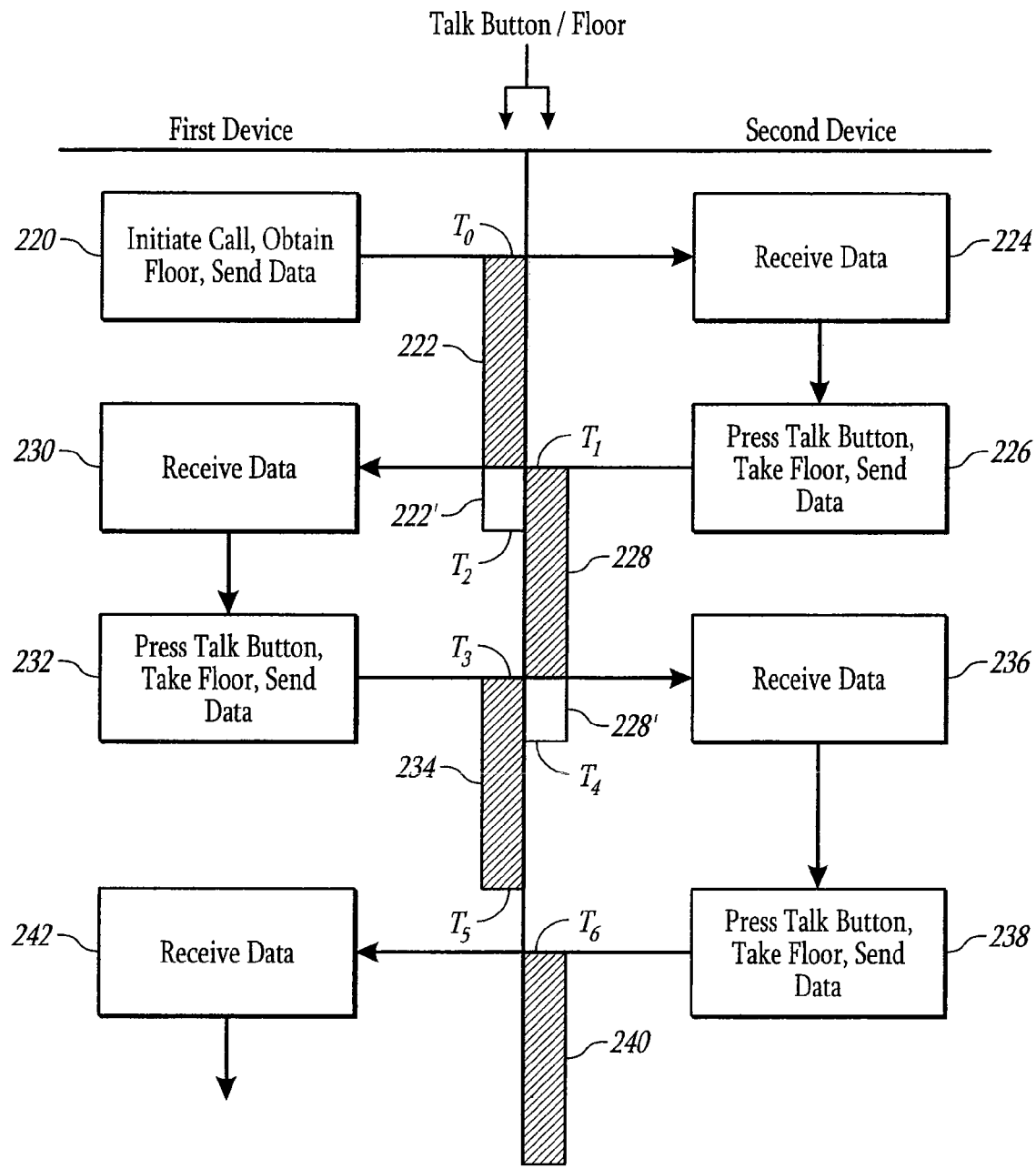
FIG. 2a is a flow diagram depicting a method by which the floor is reassigned when a receiving party presses the talk button of a network-based instant connect device.

FIG. 2a is a flow diagram that illustrates a method according to a first embodiment of the invention for transferring the floor to a recipient device in response to user input provided to the recipient device. This method is described in reference to FIG. 1, in which network-based instant connect device 102 is designated as a first device or a sending device, and network-based instant connect device 104 is designated as a second device or a receiving device. According to this embodiment, the floor is taken by a device in the network-based instant connect communication session when a floor request signal is generated by the device, one example of which involves the talk button of the device being pressed and held down, tapped, or otherwise engaged. In FIG. 1, the periods of time during which the talk buttons of the respective devices are pressed are shown at bars 222, 228, 234 and 240, while the crosshatched regions of these bars indicate the allocation of control between devices 102 and 104.

The example illustrated in FIG. 2a begins at act 220, in which the first device initiates a network-based instant connect call, obtains the floor, and sends voice data to the second device. The network-based instant connect call can be initiated as described herein, by the floor of the first device selecting a recipient, pressing the talk button at time $T_0$ and speaking into the first device. Bar 222 of FIG. 2a indicates that the talk button is pressed by the user of the first device between time $T_0$ and $T_2$. The crosshatched region of bar 222 between time $T_0$ and $T_1$ indicates that the first device has the floor. During this time period, the second device receives the data in act 224.

At time $T_1$, the user of the second device decides to take the floor and does so by generating a floor request signal originating at the second device. This floor request signal is generated in this example by the user pressing the talk button of the second device in act 226. The floor request signal is transmitted to a network-based instant connect server in the wireless communication network 100 of FIG. 1. The floor request signal results in the floor being transferred from the first device to the second device. Alternatively, in the case where floor control logic is resident on the device, the floor control signal may be transmitted directly to the second device which results in the floor being transferred from the first device to the second device.

Bar 228 of FIG. 2a indicates that the talk button of the second device is pressed between time $T_1$ and $T_4$. The floor is transferred to the second device at time $T_1$ in response to the floor request signal, notwithstanding the fact that the floor is held by the first device up to time $T_1$ and that, at time $T_1$, the talk button of the first device continues to be pressed as shown at bar 222. Thus, the transition of the floor from the first device to the second device at time $T_1$ represents, for instance, the user of the second device interrupting or spontaneously responding to the other user without waiting for the first device to relinquish the floor. This facilitates the conversational two-way communication that has not previously been possible in network-based instant connect systems. It is noted that the floor is transferred at time $T_1$ from the first device to the second device without the first device providing consent thereto. Moreover, region 222' from time $T_1$ to $T_2$ shows that the talk button of the first device continues to be pressed for a short period of time just after the loss of the floor, indicating that the floor transition may have been unexpected by the user of the first device.

The crosshatched region of bar 228 between time $T_1$ and $T_3$ indicates that the second device has the floor. During this time period, the first device receives data in act 230. The first device, which has just lost the floor, has the ability to retake it by generating a floor request signal at time $T_3$. This floor request signal associated with the first device can also be generated by pressing the talk button, as shown in act 232. Bar 234 indicates that the talk button of the first device is pressed between time $T_3$ and $T_5$. The floor is transferred to the first device at time $T_3$ in response to the floor request signal, notwithstanding the fact that the floor is held by the second device up to time $T_3$ and that, at time $T_3$, the talk button of the second device continues to be pressed as shown at bar 228. This transition can also represent an interruption, feedback, or a response to the other party, which can be part of an ongoing, two-way conversation between the parties. This transition is initiated by the first device without waiting for the second device to relinquish the floor and without the second device providing consent thereto. Moreover, region 228' from time $T_3$ to $T_4$ shows that the talk button of the second device continues to be pressed for a short period of time just after the loss of the floor, indicating that the floor transition may have been unexpected by the user of the second device.

The crosshatched bar 234 between time $T_3$ and $T_5$ designates the floor being held by the first device. During this time period, the second device receives data in act 236. Although the first two floor transitions of FIG. 2a are associated with interruption events, the floor can also be transferred to one of the parties after the other party has relinquished it. At time $T_5$, the user of the first device relinquishes the floor when, for instance, the user of the first device has finished speaking and releases the talk button. During the period of time from time $T_5$ and $T_6$, neither device has the floor. In this situation, either party can take the floor by pressing its talk button. In the example of FIG. 2a, the second device takes the floor at time $T_6$ by pressing the talk button in act 238. During the period after $T_6$ when the second device has the floor, the first device 242 continues to receive data.

FIG. 2a illustrates various principles associated with this embodiment of the invention. In particular, a device that does not hold the floor can take it when the user generates a floor request signal by pressing the talk button of the device. If the other party has the floor when the floor request signal is generated, the other party loses the floor. As shown in FIG. 2a, this process facilitates two-way conversation patterns, including potential interruptions at time $T_1$ and $T_4$.

Figure 2B:
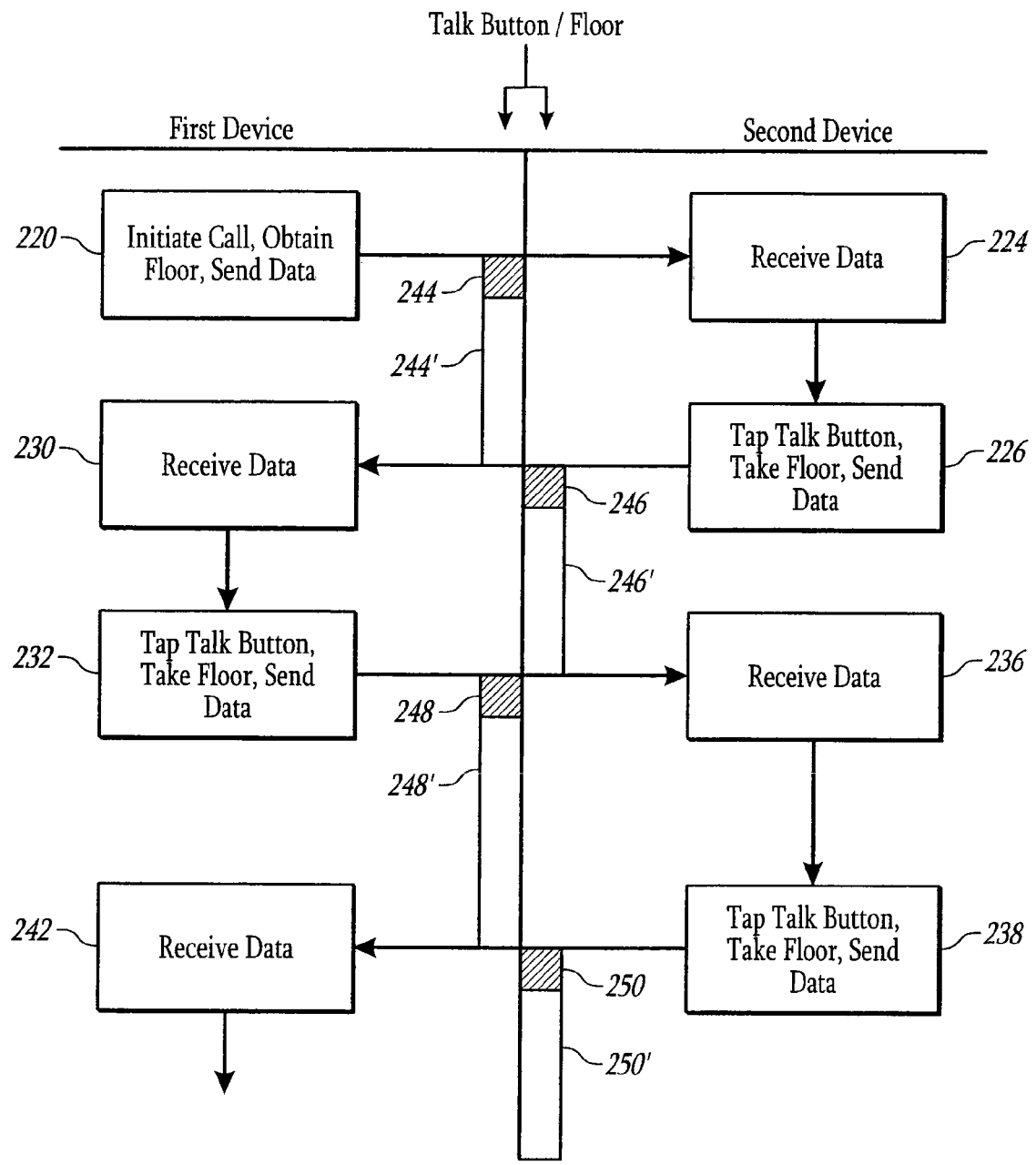
FIG. 2b is a flow diagram illustrating a method by which the floor is reassigned when a receiving party taps the talk button of a network-based instant connect device.

In an alternate implementation illustrated in FIG. 2b, the floor is transferred in response to a floor request signal that is generated at one of the devices in response to the user tapping the talk button. As used herein, a "tap" of a talk button is the act of pressing the talk button, followed shortly thereafter by the release of the talk button. In this method, the user who obtains the floor by pressing and releasing, or tapping, the talk button can maintain the floor thereafter without being required to continually maintain the talk button in the depressed position. The user obtains the floor by the initial act of pressing the talk button and loses the floor only when the remote user requests the floor.

The steps illustrated in FIG. 2b are substantially the same as those in FIG. 2a, except for the manner in which the users tap the talk button in FIG. 2b rather than pressing and holding in FIG. 2a. In FIG. 2b, the crosshatched regions 244, 246, 248 and 250 show the tapping of the talk button, while the open regions 244', 246', 248', 250' show the time during which the devices maintain the floor after a tap.

The embodiments of FIGS. 2a and 2b are also extended to wireline networks and wireline devices in which floor control occurs. For example, the floor control in a wireline-based speakerphone is typically triggered when a sensor on the speakerphone detects voice. This method can be problematic in an environment where there is audible background noise. Such noise may tend to spuriously and erroneously trigger a floor control transition when one was not intended. Additionally, problems occur when a speaker continues to speak at a rate and a volume that does not allow another speaker on the conference call to take control of the floor. The use of a button or one or more keys on the speakerphone keypad to explicitly allocate floor control can be applied to the use of such a speakerphone. In any of these situations, the method of the present invention may further be employed in this context to improve the call experience. A speaker who does not currently hold the floor can press one or more keys on the telephone to "interrupt" the speaker holding the floor, to interject a comment or otherwise reallocate the floor.

3. Transition to Full-Duplex Communication Channel

Figure 3:
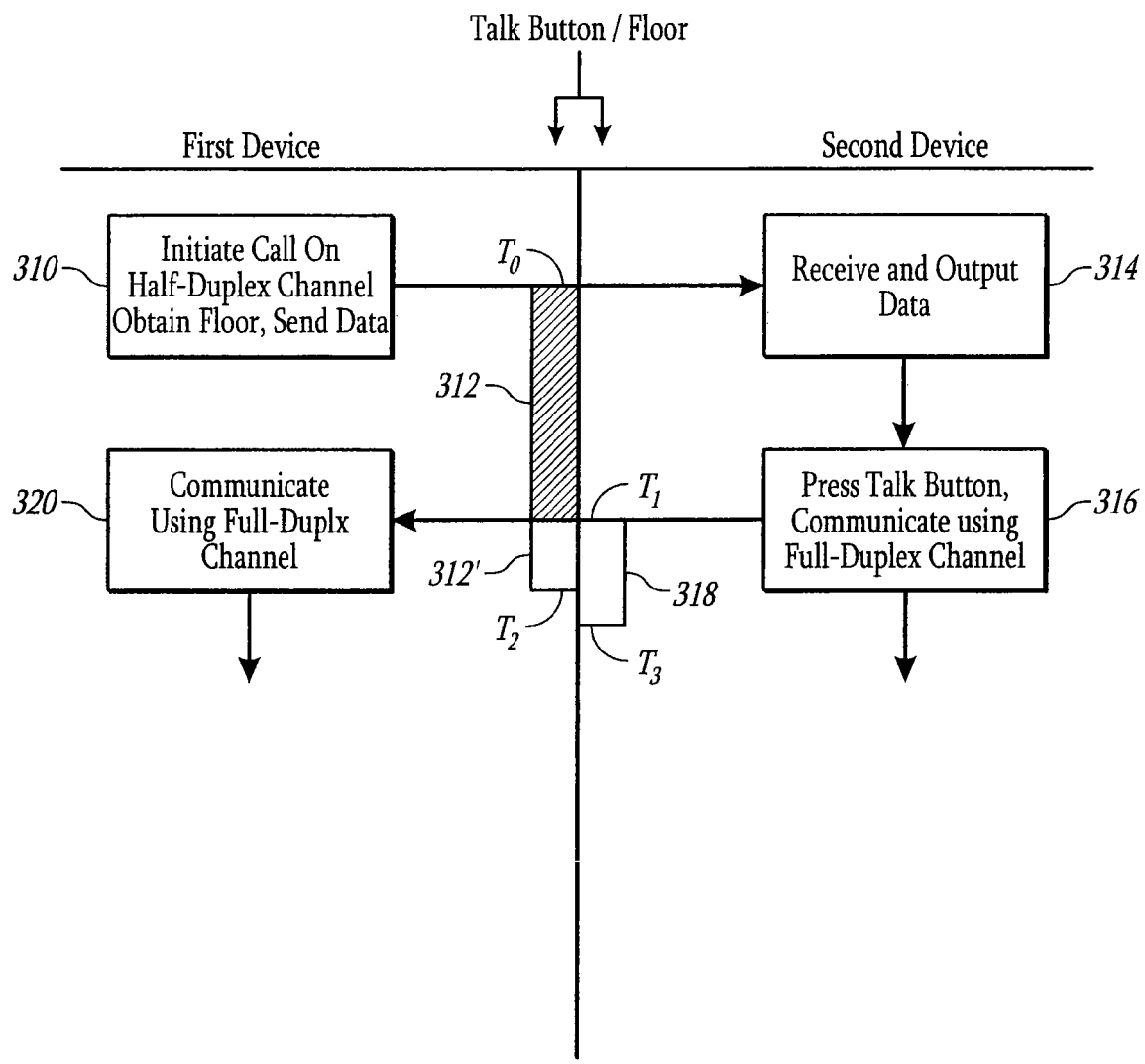
FIG. 3 is a flow diagram illustrating a method by which a network-based instant connect call is transitioned from half-duplex to full-duplex to eliminate the floor control requirements of the network-based instant connect call.

In the embodiment illustrated in FIG. 3, the need for floor allocation is eliminated by transitioning the network-based instant connect call from half-duplex communication to full-duplex communication. Conventional network-based instant connect calls are conducted as half-duplex communication in cellular networks that have the inherent ability to conduct full-duplex telephone calls.

The example of FIG. 3 begins at act 310, in which the first device initiates a network-based instant connect call which is half-duplex, obtains the floor, and sends data to the second device. The initiation of the network-based instant connect call can be similar to the process described in reference to the call of FIG. 2a. The user of the first device selects a recipient, presses the talk button at time $T_0$ and speaks into the first device. Bar 312 indicates that the talk button is pressed by the user of the first device between time $T_0$ and $T_2$. The crosshatched region of bar 312 between time $T_0$ and $T_1$ shows that the first device has the floor. During this time period, the second device receives the data in act 224, during which time the network-based instant connect call continues to be conducted using half-duplex communication. Immediately after time $T_0$, the recipient of the network-based instant connect call becomes aware of the call when the second device begins outputting the voice data. This activation of the second device to output the data is automatic and does not require the user to respond to a ring or other audible signal.

At time $T_1$, the user of the second device has decided to engage in the network-based instant connect communication session and expresses this decision in act 316 by pressing the talk button at time $T_1$. At this point, this input causes the network to transition from the original half-duplex call to a full-duplex call. The transition to a full-duplex call permits the parties to engage in ongoing two-way communication in acts 316 and 320, providing a conversation experience similar to that of mobile telephone calls. Because the full-duplex communication is used after time $T_1$, floor allocation is not needed, and both parties can send voice data at any time without pressing the talk button. Thus, the first device can continue to send data after time $T_1$ and $T_2$ (region 312') as well as after releasing the talk button at time $T_2$. Similarly, the second device can continue to send data after releasing the talk button at time $T_3$.

The network-based instant connect call established as shown in FIG. 3 exhibits the primary advantages of conventional network-based instant connect calls while eliminating the main inconveniences that have been experienced. In particular, such network-based instant connect calls can be received immediately by the recipient without having to respond to a ring or another audible signal. In addition, the need to continue to press the talk button when speaking and to wait while the other party holds the floor is eliminated when the transition to the full-duplex communication channel is made. This and the other embodiments of the invention are also capable of being practiced in existing networks and with existing network-based instant connect devices that are adapted to perform the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. In a communication system, a method comprising:
receiving first audio data, which a first mobile telephone sent in response to a press-and-hold of a talk button of the first mobile telephone;
sending a first portion of the first audio, which the first mobile telephone sent in response to the press-and-hold of the talk button of the first mobile telephone, to a second mobile telephone configured to receive and automatically play the first portion of the first audio as part of a half-duplex communication between the first and second mobile telephones;
receiving second audio data, which the second mobile telephone sent in response to a press-and-hold of a talk button of the second mobile telephone; and
as part of a full-duplex communication between the first and second mobile telephones:
sending a second portion of the first audio, which the first mobile telephone sent in response to the press-and-hold of the talk button of the first mobile telephone, to the second mobile telephone, wherein the second mobile telephone is configured to receive and automatically play the second portion of the first audio as part of the full-duplex communication between the first and second mobile telephones; and
while sending the second portion of the first audio to the second mobile telephone, sending the second audio, which the second mobile telephone sent in response to the press-and-hold of the talk button of the second mobile telephone, to the first mobile telephone, wherein the first mobile telephone is configured to receive and automatically play the second audio as part of the full-duplex communication between the first and second mobile telephones.

2. The method as in claim 1, wherein the half-duplex communication between the first and second mobile telephones is a network-based instant connect communication session.

3. The method as in claim 1, wherein the half-duplex communication between the first and second mobile telephones is a network-based instant connect communication session; and
wherein the press-and-hold of a talk button of the first mobile telephone successfully requested a floor of the network-based instant connect communication session.

4. The method as in claim 1, further comprising:
after the talk button of the first mobile telephone is released, continuing to send audio from the first mobile telephone to the second mobile telephone as part of the full-duplex communication between the first and second mobile telephones; and after the talk button of the second mobile telephone is released, continuing to send audio from the second mobile telephone to the first mobile telephone as part of the full-duplex communication between the first and second mobile communications.

5. The method as in claim 1, further comprising:

after the talk button of the first mobile telephone is released, continuing to send additional audio from the first mobile telephone to the second mobile telephone as part of the full-duplex communication between the first and second mobile telephones.

6. The method as in claim 1, further comprising:

after the talk button of the second mobile telephone is released, continuing to send audio from the second mobile telephone to the first mobile telephone as part of the full-duplex communication between the first and second mobile telephones.

7. A system comprising:

a network configured to perform a method, the method comprising:

receiving first audio data, which a first mobile telephone sent in response to a press-and-hold of a talk button of the first mobile telephone;

sending a first portion of the first audio, which the first mobile telephone sent in response to the press-and-hold of the talk button of the first mobile telephone, to a second mobile telephone configured to receive and automatically play the first portion of the first audio as part of a half-duplex communication between the first and second mobile telephones;

receiving second audio data, which the second mobile telephone sent in response to a press-and-hold of a talk button of the second mobile telephone; and as part of a full-duplex communication between the first and second mobile telephones:

sending a second portion of the first audio, which the first mobile telephone sent in response to the press-and-hold of the talk button of the first mobile telephone, to the second mobile telephone, wherein the second mobile telephone is configured to receive and automatically play the second portion of the first audio as part of the full-duplex communication between the first and second mobile telephones; and while sending the second portion of the first audio to the second mobile telephone, sending the second audio, which the second mobile telephone sent in response to the press-and-hold of the talk button of the second mobile telephone, to the first mobile telephone, wherein the first mobile telephone is configured to receive and automatically play the second audio as part of the full-duplex communication between the first and second mobile telephones.

8. The system as in claim 7, wherein the half-duplex communication between the first and second mobile telephones is a network-based instant connect communication session.

9. The system as in claim 7, wherein the half-duplex communication between the first and second mobile telephones is a network-based instant connect communication session; and wherein the press-and-hold of a talk button of the first mobile telephone successfully requested a floor of the network-based instant connect communication session.

10. The system as in claim 7, wherein the method, which the network is configured to perform, further comprises:

after the talk button of the first mobile telephone is released, continuing to send audio from the first mobile telephone to the second mobile telephone as part of the full-duplex communication between the first and second mobile telephones; and after the talk button of the second mobile telephone is released, continuing to send audio from the second mobile telephone to the first mobile telephone as part of the full-duplex communication between the first and second mobile telephones.

11. The system as in claim 7, wherein the method, which the network is configured to perform, further comprises:

after the talk button of the first mobile telephone is released, continuing to send additional audio from the first mobile telephone to the second mobile telephone as part of the full-duplex communication between the first and second mobile telephones.

12. The system as in claim 7, wherein the method, which the network is configured to perform, further comprises:

after the talk button of the second mobile telephone is released, continuing to send audio from the second mobile telephone to the first mobile telephone as part of the full-duplex communication between the first and second mobile telephones.

* * * * *